United States Patent [19]

Schmoelzer

[11] Patent Number: 4,673,224
[45] Date of Patent: Jun. 16, 1987

[54] BRAKE PRESSURE CONTROL UNIT

[75] Inventor: Ernst Schmoelzer, Frankfurt am Main, Fed. Rep. of Germany

[73] Assignee: Alfred Teves GmbH, Frankfurt am Main, Fed. Rep. of Germany

[21] Appl. No.: 796,858

[22] Filed: Nov. 12, 1985

[30] Foreign Application Priority Data

Nov. 16, 1984 [DE]  Fed. Rep. of Germany ....... 3441964

[51] Int. Cl.⁴ .......................... B60T 17/00; B60T 8/18
[52] U.S. Cl. ..................................... 303/56; 303/22 R
[58] Field of Search ................. 303/1, 22 R, 23 R, 56; 188/195

[56] References Cited

U.S. PATENT DOCUMENTS 4,058,347  11/1977  Reinecke ........................... 303/22 R

FOREIGN PATENT DOCUMENTS 0029398  5/1981  European Pat. Off. .
1946102  11/1969  Fed. Rep. of Germany .
2905098  8/1980  Fed. Rep. of Germany .
2112043  6/1972  France ............................. 303/22 R

*Primary Examiner*—Duane A. Reger
*Attorney, Agent, or Firm*—James B. Raden; Donald J. Breh

[57] ABSTRACT

The invention is related to a brake pressure control unit which is pilotable load-sensitively through a pilot device, a spring device, and a transmission lever. The pilot device includes a first pilot element being fastened to an unsprung member of the vehicle which is movable load-sensitively relating to the housing which is mounted to a spring member of the vehicle. The pilot device also includes a spring positioned between both the two pilot elements. Mounting of the unit to a lifted vehicle is provided by locking the transmission lever is a predetermined position by locking the pilot element together. A gauge loads the second pilot element to the transmission lever in the predetermined position. The two pilot elements are rigidly coupled to each other by a coupling member during installation to form a constructional unit of a predetermined length.

12 Claims, 5 Drawing Figures

BRAKE PRESSURE CONTROL UNIT

BACKGROUND OF THE INVENTION

This invention is related to a brake pressure control unit for a hydraulic fluid-actuatable vehicle brake system of the type including a spring device for load-sensitively pivoting the pressure control unit and wherein the spring device is pivotably mounted to a vehicle member for generating input motions relative to the brake pressure control unit. The pressure control unit is provided with at least one valve with a control piston being pressure-sensitively slidable in the direction of closure of the valve against the force of the spring device. These systems typically provide for the spring device to be mounted to a swivelling transmission lever, which is connected to the control piston of the valve. A pilot device through which the spring force of the spring device is made variable in response to the load of the vehicle is connected to the spring device and includes a first pilot element connected to the vehicle member providing the pivotal input motion, a second pilot element connected to the transmission lever, and a spring positioned between the two pilot elements.

A brake pressure control unit of this type is disclosed in the European patent applicatio No. 0,029,398 which includes a pilot device substantially comprising a first pilot element connected to an unsprung member of the vehicle, a second pilot element connected through a tension spring device to the transmission lever which is supported at the housing, and an auxillary spring is arranged between the first and second pilot elements. During mounting of this brake pressure control unit to a vehicle, the housing is fastened to a sprung member and the first pilot element is fastened to an unsprung member of the vehicle with the load-sensitive spring device locked. A removable stop ring is arranged at the first pilot element during mounting. The length of the second pilot element is varied until the end of the second pilot element is in abutment against the stop ring of the first pilot element. During this installation, the transmission lever is in the position corresponding to the open position of the valve. After mounting, the spring device is unloaded and the stop ring at the first pilot element removed. The second pilot element will thereby slide against the force of an auxially spring positioned internally between the pilot elements until an equilibrium position between the two spring forces is reached. In the event of a variation of the position of the unsprung vehicle member relative to the housing of the brake pressure control unit, an equilibrium between the spring forces will take place. Two spring elements thereby contribute to the application of the force of control transmitted by the transmission lever to the valve device of the brake pressure control unit, which can lead to reduced precision of the piloting action.

In order to improve the precision, it has heretofore been proposed in a brake pressure control unit of this type to lock the spring device during mounting of the brake pressure control unit in the vehicle in a position corresponding to a predetermined loading condition, and during this procedure, to rigidly lock together the first and the second pilot elements to form a constructional unit of a defined length. This method bears the advantage that the auxilliary spring positioned between the pilot elements does not influence the force of control. When the brake pressure control unit and the first pilot element are being fastened to the respective vehicle members with the spring device locked, the transmission lever will assume that position which corresponds to a defined open position of the valve. The effect of the auxilliary spring on the piloting of the brake pressure control unit is eliminated as a result of the two pilot elements being rigidly interconnected. Incorrect adjustment of the pilot device caused by an incorrect adjustment of the transmission lever is eliminated. This system requires that, during mounting, the vehicle or, more precisely, its axle to which one pilot element is attached must be in a predetermined loading condition which corresponds to the position of the second pilot element with respect to the transmission lever with the spring device in locked condition. Therefore, such a device presently requires that the vehicle be in a loaded state, most typically, having all wheels resting on the ground during installation of the brake pressure control unit.

SUMMARY OF THE INVENTION

It is the object of the invention to provide a brake pressure control unit of the kind mentioned that allows installation of the brake pressure control unit at a predetermined open position of the valve with the vehicle wheels hanging freely, that is, with the vehcile lifted from the ground and such that there is no influence of the auxilliary spring on the force of control.

According to an important aspect of the invention, this object is achieved in that the first and the second pilot elements are connected by means of a connecting apparatus to form a constructional unit of a defined length with the housing of the brake pressure control unit fastened to the relevant vehicle member and the auxilliary spring positioned between the pilot elements maintaining the first pilot element in abutment against the relevant vehicle member and the transmission lever, which is rigidly connected to the second pilot element, in abutment against the control piston of the valve of the pressure control unit. In this way, the brake pressure control unit can be intalled in a vehicle while the vehicle is lifted up with its wheels hanging freely. The points of the vehicle at which the brake pressure control unit is to be fastened are thereby rendered easily accessible. Also, with the vehicle lifted up from the ground, the adjustment of the first and second pilot elements to the proper length between the respective vehicle attachment points, as well as the actual attachment of the two pilot elements to each other, can be carried out quickly and easily. This will allow the installation of the brake pressure control unit to be performed in a much easier and more economical way.

According to an important aspect of the invention, a spring pivot element is connected to the transmission lever and is provided near its end facing away from the spring device with a circular groove into which a gauge is introducible having a projection having a corresponding configuration. The gauge interconnects the second pilot element to the spring pivot element in the predetermined relative position by means of a cap-shaped section surrounding a nut arranged near the end of the second pilot element. The gauge provides for easy and quick application and removal from the spring pivot element, and to the second pilot element.

Preferably, the gauge is formed with a U-shaped recess having a round bottom comprising sections which are each adapted to the diameters of the groove of the collar at the end of the spring pivot element of the nut and of the second pilot element, respectively.

It will therefore be of advantage to provide the gauge with a ring for gripping on its side facing away from the U-shaped recess. This arrangement will facilitate its handling.

According to an advantageous feature of the invention, it is envisaged that the gauge be furnished with a predetermined breaking point corresponding to the force which occurs during lowering of the vehicle as a result whereof, it will be unnecessary to pull off the gauge manually.

According to another feature of the invention, the first pilot element is configured in the shape of a clamping element which surrounds the second pilot element with a bore and which is supported at a support plate screwable or boltable to the related vehicle member. The clamping element is preferably furnished with a threaded bore which extends in radial direciton with respect to the second pilot element and into which a set screw is threaded to secure the clamping element to the second pilot element. With the aid of this apparatus, the brake pressure control unit can be quickly and easily adapted to the distance exising in each case between the points of connection of the vehicle members when the axle is hanging down.

Preferably, the spring device is lockable in a position prior to mounting, said position corresponding to a determined loading condition, preferably to the empty, unloaded vehicle. After the vehicle has been returned to the ground, that is, from the lifted position, the preadjustment of the pilot device related to the empty vehicle load is attained.

Advantageously, the rod-shaped end of one of the pilot elements is arranged slidably within a bore of the other pilot element with the connecting apparatus being provided at the other element and having a threaded insert which presents a conical surface through which a ring support at the front side of the other element is pressable against or pressable into the one pilot element. An infinite adjustment of the defined length of the constructional unit made up of both pilot elements is achieved, and a piloting action free of play is also provided for.

The pilot device can be simplified by arranging a compression spring in the bore in one end of the second pedal element and providing a collar at one end of the spring device against which the compression spring takes support. The transmission lever is supported at the end of the spring device opposite the collar.

According to still another important feature of the invention, it is envisaged that the spring device is suported at the transmission lever by means of a swivel element. In this manner, the vehicle member, which moves relative to the brake pressure control unit, is allowed advantageously to move also in a direction at right angles to the longitudinal axis of the pilot device.

The cost of manufacture is reduced and mounting is eased by an embodiment in which the swivel element is configured as an element shaped from metal plate formed with two pivot pins which have circular segment-shaped cross sections and with which the swivel element is introduced into unilaterally open bearings at the transmission lever, which is configured as an element shaped from metal plate. The bearings are provided with openings for the insertion of the pins.

BRIEF DESCRIPTION OF THE DRAWINGS

The invention will be better understood after reading the following Detailed Description when taken in conjunction with the drawings in which.

DETAILED DESCRIPTION OF THE PREFERRED EMBODIMENT

Figure 1:
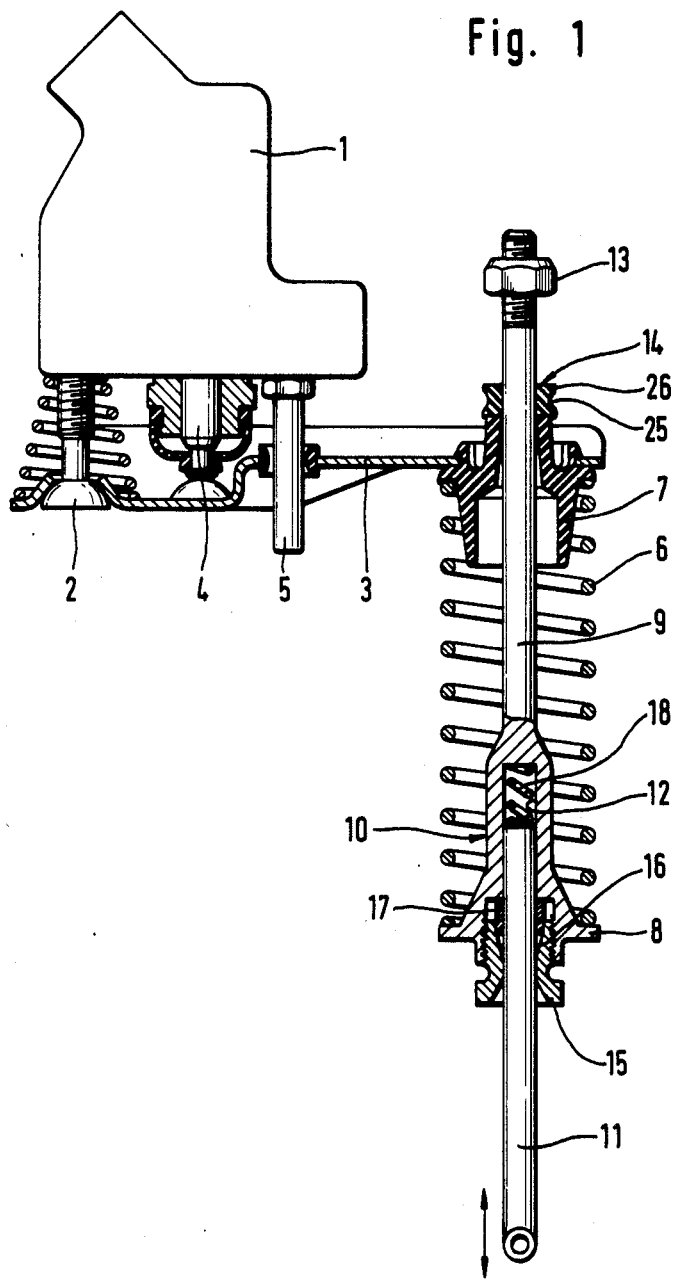
FIG. 1 is a partial, cross-sectional view of a preferred embodiment of a brake pressure control unit of the present invention.

A load-sensitively pilotable brake pressure control unit for a hydraulic fluid-actuatable vehicle brake system includes a housing 1, a transmission lever 3 swivellingly supported at a ball pin 2 at one end, and two valves, only one of which is shown, are arranged within the bores internally of the housing 1. A control piston 4 of one of the valves projects from the housing 1. As shown in FIG. 1, a pilot device 10 and a spring device 6 are provided to apply a control force to the piston 4 via the lever 3.

A hydraulic fluid inlet being in connection with a brake pressure source and a hydraulic fluid outlet leading to at least one rear wheel cylinder are provided to each valve.

The ends of both control pistons 4 are abutted against part-spherical-shaped buldges of the transmission lever 3. From a predetermined open position of the valve, the control pistons 4 are, at a determined brake pressure in the course of the brake pressure build-up, pushed in an axial direction out of the housing 1 into a closed position under the effect of the hydraulic fluid against a control force applied by the spring 6, to the piston 4 over the transmission lever 3. The valve closing occurs at a change-over pressure which defines a change-over point. In a brake pressure control unit adapted, for example, as a pressure reducer, a pressure increase at the hydraulic fluid inlet is reduced at the hydraulic fluid outlet an amount proportional to the active area of the control piston 4, which is subjected to the inlet pressure upon closure of the valve.

The plane of the swivelling motion of the transmission 3 about the ball pin 2 is fixed by a guide pin 5. In addition to the swivelling motion, the transmisssion lever 3 can perform a tipping motion about the ball pin 2 which provides uniform distribution of the control force to the ends of the control pistons 4.

In FIG. 1, theend of the transmission lever 3, which is displaced from the ball pin 2, is provided with a spring pivot element 7 being formed with an opening and serving to support the spring device 6 which includes a compression spring. The opening in the spring pivot element 7 has a generally a conical shape providing for tipping motion of the lever 3 as well as for pivotal movement of a pilot device 10 relative to the housing 1 of the brake pressure control. The pilot device 10 includes a first element 11 and a second element 9. The other end of the spring device 6 is supported by a collar 8 on the second pilot element.

The pilot device 10 additionally includes a spring 18 positioned between the first element 11 and the second element 9 in a bore 12 in the element 9. The first pilot element 11 has a rod-shaped configuration and is fixed at one end to a member of the vehicle that is load-sensitively movable relative to the housing of the brake pressure control unit, for example, to a member which is coupled to the rear axle, not shown, of the vehicle. The other end projects slidably into a bore 12 in the second pilot element 9 at which the spring device 6 takes support. The end of the pilot element 9, opposite the collar 8, extends through openings in the spring pivot element 7 and in the transmission lever 3, and is provided with a threaded section onto which a nut 13 is threaded to limit the sliding travel of the pilot element 9 with respect to the spring pivot element 7 and the transmission lever 3.

The end of the spring pivot element 7 facing the nut 13 includes a circular groove 25 which is succeeded by a collar 26.

Figure 2:
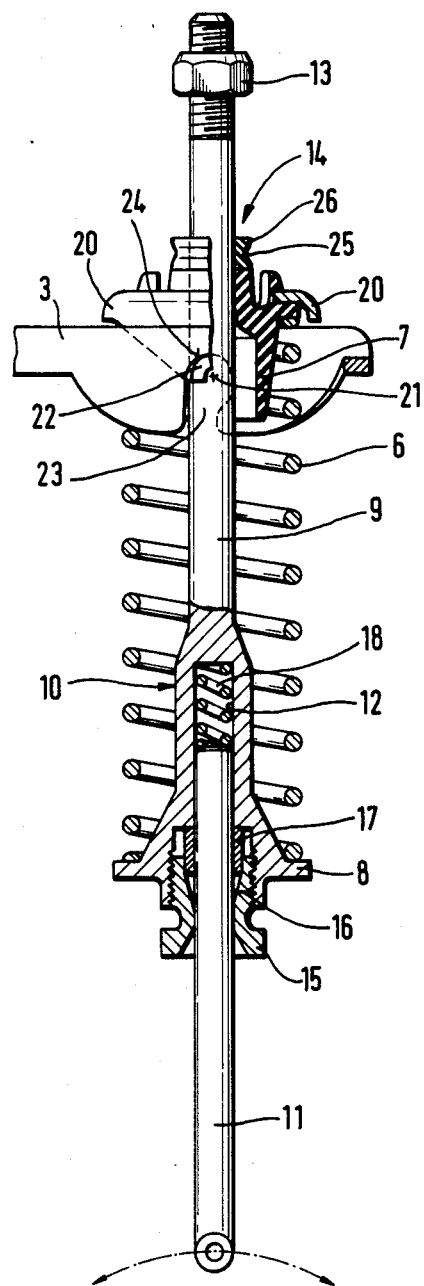
FIG. 2 is an enlarged, partial cross-sectional view of the pilot device for the brake pressure control unit of FIG. 1.

With respect to the spring pivot element 7, the pilot elements 9, 11 shown in FIGS. 1 and 2 are in positions which correspond to determined load conditions of the vehicles. In these load conditions, a predetermined change-over pressure of the brake pressure control unit is provided by adjusting the preload of the spring device 6.

In the bore 12 in the second pilot element 9, there is arranged the spring 18 which takes support at the first pilot element 11, on one side, and at the second pilot element 9, on the other side, and which urges the two elements 9, 11 away from each other.

At its outer end, the bore 12 is formed with an extended section furnished with an internal thread into which is threaded an insert 15 having an opening for the first pilot element 11 and a conical flare 16 at the end facing the bore 12. At the conical flare 16, one end of a preferably slotted ring 17 is applied whose other end is in abutment against the shoulder existing at the transition from the extended section to the narrow section of the bore 12. By screwing in the threaded insert 15, the ring 17 is urged through the cone radially inwardly against the first pilot element 11 so that both elements are coupled together to form a constructional unit of a predetermined length.

Referring to FIG. 2, the spring pivot element 7 in the pilot device 10 illustrated is not fastened directly to the transmission lever 3 but is attached to a swivel element 20 which is movable about a swivel axis 21. The swivel element 20 is configured as an element shaped from metal plate and is formed with two pivot pins 22 which present a substantially circular segment-shaped cross section. The swivel element 20 allows to be inserted, with the pivot pins 22, through openings 23 into bearings 24 which are open unilaterally and are provided at the transmission lever 3. The transmission lever 3 is also configurated as an element shaped from metal plate. The openings 23 have a width which corresponds to the height of the circular segment-shaped section of the pivot pins 22, whereas the bearings 24 have a diameter slightly larger than the diameter of the pivot means 22 providing for free play motion.

The free or lost motion play which exists between the swivel element 20 and the transmission lever 3 and the control pistons 4 is taken up during mounting of the pilot device 10 by the spring 18 which urges the transmission lever 3 into the position in which the valves are in a predetermined open position. This arrangement of the swivel element 20 allows the vehicle member to which the first pilot element 11 is fastened is to move not only in the axial direction of the pilot device 10, but also simultaneously transversely to it as it indicated by the arrows in FIG. 2.

Figure 3:
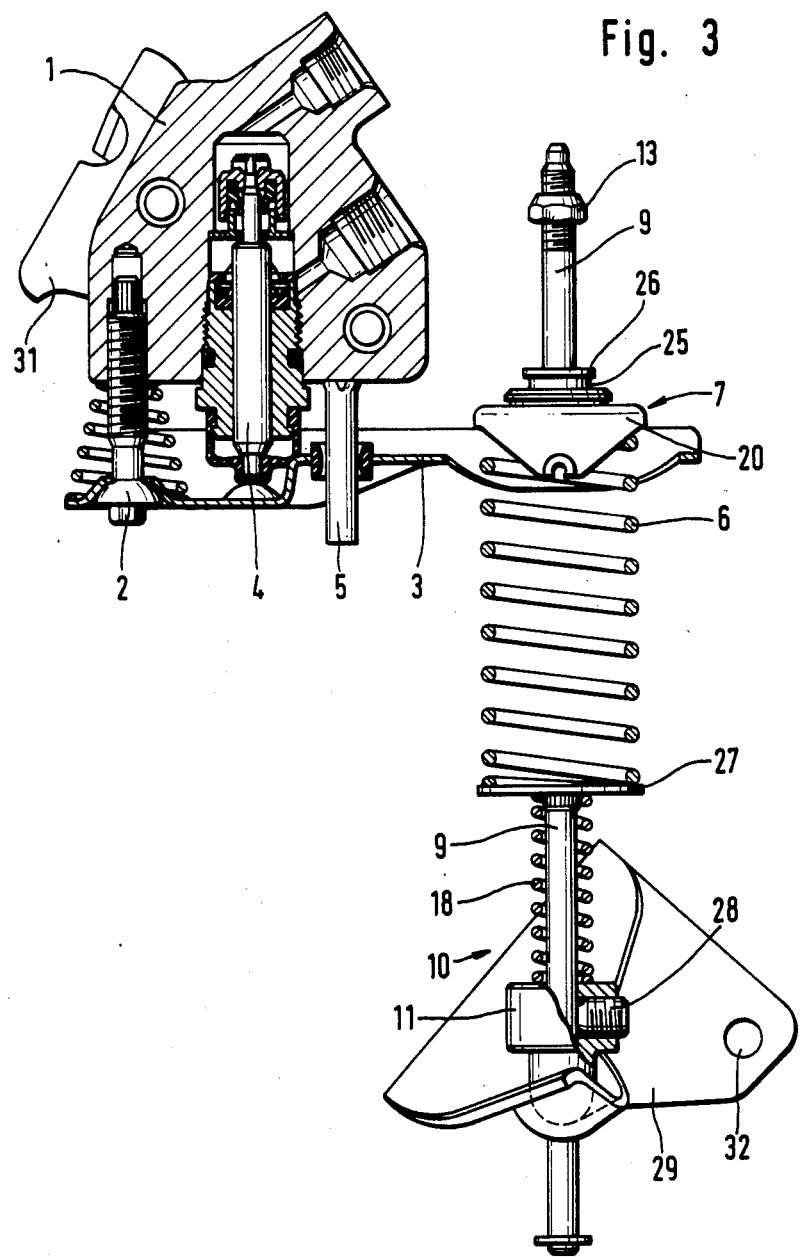
FIG. 3 is a partial, cross-sectional view of another embodiment of a brake pressure control unit according to the invention showing details of construction.

In the brake pressure control unit shown in FIG. 3, the swivel element 20 is again coupled to the spring pivot element 7. In this configuration, the spring device 6 takes support at one end at the spring pivot element 7, and at the other end at the rim of a conical plate 27 which is fastened to the rod-shaped pilot element 9, approximately in the center of the latter.

The first pilot element 11 is configured as a clamping element having a bore into which the pilot element 9 projects. The clamping element 11 is provided with a threaded bore extending in radial direction with respect to the pilot element 9 into which bore a set screw 28 is screwable to rigidly secure the clamping element 11 to the pilot element 9. The clamping element is supported at a support plate 29 which is screwed or bolted to the related vehicle member.

FIG. 3 shows the brake pressure control unit in a position of the pilot element 9 relative to the transmission lever 3 which corresponds to a determined load condition of the vehicle to which the brake pressure control unit is to be connected.

The brake pressure control units illustrated in FIGS. 1 to 3 are installed in vehicles which are, for example, in a lifted position with the relevant axle and wheels are hanging down freely. The vehicles are expediently placed on a car lift for the purpose.

Figure 4:
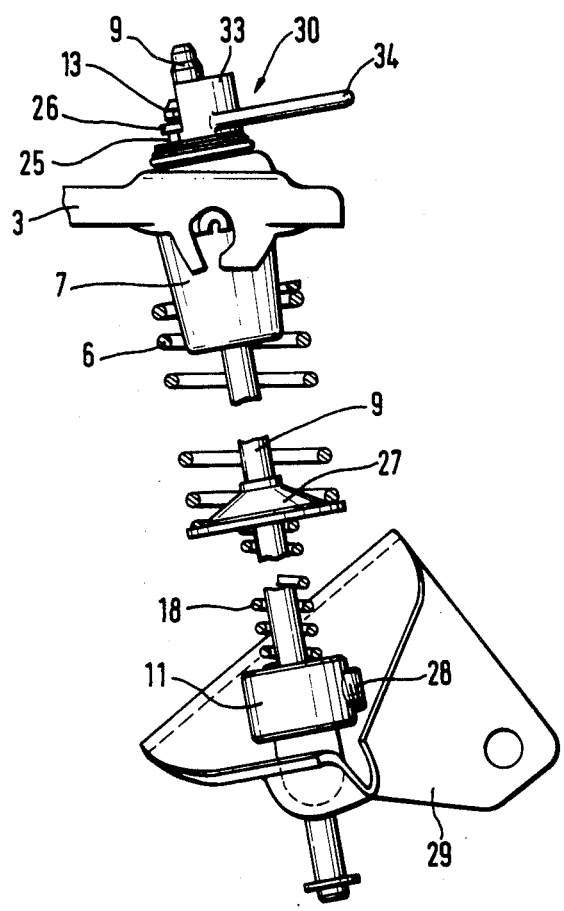
FIG. 4 is an elevational view of a pilot device for the brake pressure control unit according to FIG. 3 in the condition ready to be installed.
Figure 5:
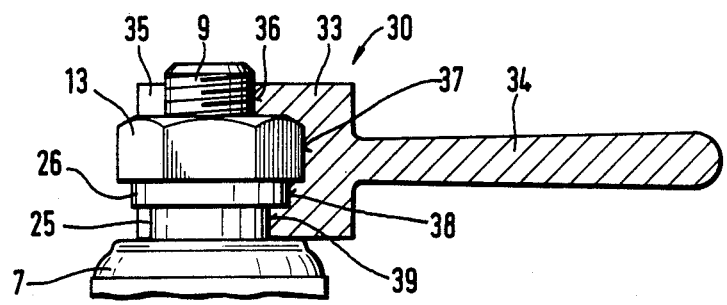
FIG. 5 is an enlarged, partial cross-sectional view of the pilot device shown in FIG. 4.

The brake pressure control unit is adjusted to a determined load condition with a gauge which positions the spring device 6 in the predetermined load condition. The pilot elemet 9 is shifted upon removal of the gauge as a result whereof a nut 13 serves as a limiting means against which the collar 26 on the pilot element 9 abuts when the gauge is removed. The predetermined position at which the nut 13 abuts the collar 26 so as to correctly position the spring pilot element 7, is shown in FIG. 4. The brake pressure control unit, according to FIGS. 1 to 3, is adjusted in the same manner by means of the gauge 30 prior to installation.

After adjustment of the pedal elements with the gauge 30, the housing 1, which may, for example, be provided with a holder 31 shown in FIG. 3, is fastened to the lifted vehicle. Subsequently, the connection between the pilot elements 9 and 11 is detached. In the embodiment illustrated in FIG. 3, the set screw 28 is unscrewed for this purpose. The first pilot element 11 is now shifted by means of the support plate 29 against the force of the spring 18 and the support plate 29 is fastened at the appropriate point on the vehicle by means of a screw or bolt with the aid of a bore 32 in the support plate 29. The spring 18 urges the transmission lever 3 against the piston 4 through the second pilot element 9, the nut 13, the gauge 30, the spring pivot element 7, and the swivel element 20. The total play between the individual components is eliminated owing to this closed friction-type locking from the support plate 29 up to the control piston 4. After securing the control unit and mounting plate to the vehicle, the second pilot element 9 is is rigidly coupled to the first pilot element 11 by tightening the set screw 28 (FIG. 4) or the threaded insert 15 (FIG. 1), as a result whereof the dynamic effect of the spring 18 is eliminated. Following this, the gauge 30 is then removed.

When the vehicle is put back on its wheels after the brake pressure control unit has been mounted, the spring device 6 will be urged again against the spring pivot element 7 and against the transmission lever 3. The predetermined change-over pressure corresponding to the predetermined load condition will come about at this installed position of the controller. It can be seen that preadjustment of the controller is provided even when being mounted in a vehicle in a lifted condition. Mounting in a lifted vehicle is much simpler and easier.

The gauge 30 for determining the position of the nut 13 includes a body 33 which may have the shape of a semi-cylinder, and a ring 34 fastened at one side of the body 33. The body 33 is formed with a U-shaped recess 35 whose bottom presents round sections 36, 37, 38, and 39. The projecting section 39 is adapted to the diameter of the groove 25. The section 38 which is adjacent to the section 39 has a width corresponding to the collar 26. The section 37, which is juxtaposed to the section 38, is adapted to the maximum radial extension of the nut 13. The section 36 adjacent the section 37 surrounds the end of the rod-shaped pilot element 9 on a semi-circle. The ring 34 is positioned on the side of the gauge 30 which faces away from the recess 35. The gauge 30 provides for easy, quick installation in radial directions relative to the rod-shaped pilot element 9 in order to secure the nut 13 to the spring pivot element 7 and provides for easy removal from the pilot elememnt 9 in the same manner. Its handling is facilitated by the ring 34.

As will be appreciated from the foregoing detailed description, the brake pressure control unit can be installed in a vehicle which is lifted from the ground. This is made possible by, as described above, preadjusting the second pilot element 9 to a predetermined position relative to the spring pivot element 7 by using a gauge to position a nut 13 on the pilot element 9 against which the first pilot element 11 will abut, that is to say, the nut 13 is positioned such that the distance between the nut and spring pivot element 7 is equal to the position defining the load condition and the positon defining the condition in which the vehicle axle hangs freely down.

What is claimed is:

1. A brake pressure control unit for a hydraulic fluid actuatable vehicle brake system of the type having a spring device for sensing vehicle load mounted to a vehicle member for instantaneously translating said vehicle load to a brake pressure control unit mounted to a spring member of the vehicle having at least one valve with a control piston being pressure sensitively slidable in a closure direction against a force of said spring device transmitted thereto through a swivelling transmission lever mounted between said spring device and said control piston comprising:
   a pilot device including a first element affixed to an unsprung vehicle member; a second pilot element operatively connected to said transmission lever, through said spring device and a spring disposed between said first and said second pilot element;
   means for temporarily rigidly connecting said first pilot element to said second pilot element to form a constructional unit having a predetermined length related to a predetermined load condition of said vehicle; and
   means associated with said pilot device and said spring device for adjusting said spring device to exert a force on said transmission lever corresponding to said predetermined load condition of said vehicle, thereby defining a predetermined pressure change over position of said valve, said pilot device having said predetermined length with said spring device adjusted to said predetermined load condition.

2. The brake pressure control unit as claimed in claim 1, wherein the predetermined length of said constructional unit is greater than the length of said constructional unit coming about at said determined load upon removal of said means for connecting said first and said second pilot elements.

3. The brake pressure control unit as claimed in claim 1 wherein said mean for adjusting said spring device includes a spring pivot element connected to said transmission lever including a circular groove into which a gauge having a corresponding projection is adapted to be received, said gauge rigidly connects said second pilot element to said spring pivot element in spaced apart relation defining the predetermined length of said constructional unit, said gauge includes a cap-shaped section surrounding a nut arranged on said second pilot element, said nut being positioned against said gauge, said gauge being detachable from said nut.

4. The brake pressure control unit as claimed in claim 3, wherein said gauge is formed with a U-shaped recess having a round bottom and including a plurality of sections, said sections adapted to receive the configuration of said groove, a collar at the end of said spring pivot element of said nut and of said second pilot element respectively.

5. The brake pressure control unit as claimed in claim 3, wherein said gauge includes a U-shaped recess and a ring on a side facing away from said U-shaped recess.

6. The brake pressure control unit as claimed in claim 3, wherein said gauge provides for a predetermined breaking point corresponding to a force which occurs during lowering of the vehicle providing for said detachment and removal of said gauge.

7. The brake pressure control unit as claimed in claim 2, wherein said first pilot element is configured in the shape of a clamping element which surrounds said second pilot element, said clamping element including a bore into which said second pilot element is slidably received, said clamping element supported by a support plate mounted to said unsprung vehicle member.

8. The brake pressure control unit as claimed in claim 7, wherein said clamping element is provided with a threaded bore which extends in a radial direction with respect to the said second pilot element and into which a set screw is screwable to secure said second pilot element.

9. A brake pressure control unit as claimed in claim 2, wherein a rod-shaped end of said first pilot element is slidable within a bore in said second pilot element, said means for connecting said first element to said second pilot element including a threaded insert surrounding said first pilot element defining a conical surface against which a slotted ring is supported by said second pilot element is pressable.

10. The brake pressure control unit as claimed in claim 9, further comprising said spring arranged in said bore of the said second pilot element, a collar provided at one end of said spring device against which one end of a compression spring is supported, a second end of said compression spring is supported at said transmission lever, and a free end of said second pilot element extends through an opening in said transmission lever.

11. The brake pressure control unit as claimed in claim 10, wherein said spring device is supported at said transmission lever by a swivel element.

12. A brake pressure control unit as claimed in claim 11, wherein said swivel element is configured as an element shaped from metal plate and is formed with two pivot pins, each having a circular segment-shaped cross section, said swivel element is introducible into two unilaterally open bearings in said transmission lever, said transmission lever configured as an element shaped from metal plate, said bearings being provided with openings providing for the insertion of said pins therein.

* * * * *